United States Patent [19]

Lentz et al.

[11] Patent Number: 5,245,901

[45] Date of Patent: Sep. 21, 1993

[54] FEEDING DEVICE FOR A ROLLER KNIFE CUTTER FOR LONGITUDINAL AND TRANSVERSE SEVERANCE

[75] Inventors: Norbert Lentz, Essen; Harald Schmidt, Langerwehe; Walter Sommer, Essen, all of Fed. Rep. of Germany

[73] Assignee: Krupp Maschinentechnik Gesellschaft mit beschränkter Haftung, Essen, Fed. Rep. of Germany

[21] Appl. No.: 9,654

[22] Filed: Jan. 28, 1993

[30] Foreign Application Priority Data

Feb. 8, 1992 [DE] Fed. Rep. of Germany ....... 4203683

[51] Int. Cl.⁵ ...................... B21D 43/00; B23D 19/09
[52] U.S. Cl. ...................... 83/404.2; 83/155;
83/407; 83/409; 83/435.2; 271/193; 198/433;
198/690.1
[58] Field of Search ...................... 83/151, 155, 404.1,
83/404.2, 404.4, 407, 409, 425.2, 425.3, 425.4,
435.2; 271/193; 198/433, 457, 690.1

[56] References Cited

U.S. PATENT DOCUMENTS

| | | | |
|---|---|---|---|
| 2,668,591 | 2/1954 | Winters | 83/158 |
| 3,554,131 | 1/1971 | Radovic | 198/690.1 |
| 4,563,926 | 1/1986 | Boardman | 83/155 |
| 4,798,275 | 1/1989 | Leemkuil et al. | 198/457 |

Primary Examiner—Hien H. Phan
Attorney, Agent, or Firm—Spencer, Frank & Schneider

[57] ABSTRACT

A roller knife cutter includes a first knife shaft pair for severing a ferromagnetic metal sheet into sheet metal strips forwarded in a first direction of advance; and a plurality of substantially coplanar plates arranged downstream of the first knife shaft pair in a series in the first direction of advance. The plates are separated from one another by a clearance. The cutter further has an endless belt having an upper run moving in a second direction of advance and positioned in the clearance and extending parallel therewith. The upper run has a lowered position in which a top surface of the upper run is at a level below the top surfaces of the plates and a lifted position in which the top surface of the upper run is substantially coplanar with the top surfaces of the plates; and a plurality of individually height-adjustable magnet units arranged in a series underneath the upper run parallel to the second direction of advance. Each magnet unit has a low position allowing the upper run of the endless belt to be situated in the lowered position and a high position raising the upper run into the lifted position.

8 Claims, 6 Drawing Sheets

FEEDING DEVICE FOR A ROLLER KNIFE CUTTER FOR LONGITUDINAL AND TRANSVERSE SEVERANCE

CROSS REFERENCE TO RELATED APPLICATION

This application claims the priority of German Application No. P 42 03 683.6 filed Feb. 8, 1992, which is incorporated herein by reference.

BACKGROUND OF THE INVENTION

This invention relates to a feeding device for advancing ferromagnetic sheet metal strips cut by a first rotary knife shaft pair of a roller knife cutter from a metal sheet, to a second rotary knife shaft pair for transverse severance. The feeding device includes a mechanism for depositing the sheet metal strips and at least one circulating carrier member.

Roller knife cutters for longitudinal and transverse severance (also known as double or duplex slitters) have two knife shaft pairs provided with roller or cutter knives. The axes of one knife shaft pair are—as seen in plan view axes—arranged perpendicularly to the axes of the other knife shaft pair, as disclosed in European Patent Application, Publication No. 0 208 564 A1. With the first knife shaft pair metal sheets, particularly for use in packaging are cut into strips and are stacked—practically without spacing between one another—on a depositing and transporting table situated downstream of the first knife shaft pair as viewed in the feed direction. At that location the strips have to be separated and individually fed to the second knife shaft pair in a direction perpendicularly to the feeding direction of the first knife shaft pair. For separating the strips and feeding them to the second knife shaft pair essentially two solutions are known.

In one type of conventional feeding device the sheet metal strips cut by the first knife shaft pair are deposited in planes of different heights. The height of the different planes (or steps) decreases in a stepped or terrace-like manner towards the second knife shaft pair, wherein each sheet metal strip cut from one metal sheet or plate is associated with its own step. The circulating carrier device is generally formed of two chains whose carrier pawls, corresponding to the various depositing stages, are at different heights and are identical on the left and righthand side. Along the chains, the distance between the carrier pawls is greater than the step length or, as the case may be, the strip width so that the strips are consecutively advanced to the second knife shaft pair in a manner separated from one another.

It is a disadvantage of a feeding device of the above-outlined type that the carrier pawls on the chain and the step plates have to be reset or even replaced in case of changing the format (for example, for a different strip width or plate number); this results in undesired down periods for the roller knife cutter. Further, since the carrier pawls engage the stationary strips with a constant speed, risks are high that the trailing edge of the strips will be damaged as it collides with the carrier pawls. Also, the individual strips cut from the same sheet are exposed to various depositing conditions (various drop height and thus various duration of fall).

In another type of feeding device, rotary bars are positioned above the conveying plane for the second knife shaft pair. With each sheet metal strip a separate rotary bar is associated. The strips are pushed by the first knife shaft pair onto the bars and the bars are successively rotated so that the strips individually fall onto the transporting plane for the second knife shaft pair. Circulating chains with mechanical, form-locking carrier pawls push the thus-separated strips forward towards the second knife shaft pair.

In such a feeding device too, in case of a format change of the strips significant retooling is required. Further, the transporting plane to the second knife shaft pair is obstructed from above. This is inconvenient when standstill periods caused by unintentional occurrences are to be eliminated. For controlling the rotary bars a complex drive arrangement is required and risks are again high that the carrier pawls collide with the trailing edges of the sheet strips. In case of a format change of sheet strips significant labor input is necessary for readjustment.

SUMMARY OF THE INVENTION

It is an object of the invention to provide an improved feeding device for a roller knife cutter in which simple means ensure that a format change of the strips may be rapidly effected in a simple manner.

This object and others to become apparent as the specification progresses, are accomplished by the invention, according to which, briefly stated, the roller knife cutter includes a first knife shaft pair for severing a ferromagnetic metal sheet into sheet metal strips forwarded in a first direction of advance; and a plurality of substantially coplanar plates arranged downstream of the first knife shaft pair in a series in the first direction of advance. The plates are separated from one another by a clearance extending transversely to the first direction of advance and having respective top surfaces receiving the sheet metal strips. The cutter further has an endless belt having an upper run moving in a second direction of advance and positioned in the clearance and extending parallel therewith. The upper run has a lowered position in which a top surface of the upper run is at a level below the top surfaces of the plates and a lifted position in which the top surface of the upper run is substantially coplanar with the top surfaces of the plates; and a plurality of individually height-adjustable magnet units arranged in a series underneath the upper run parallel to the second direction of advance. Each magnet unit has a low position allowing the upper run of the endless belt to be situated in the lowered position and a high position raising the upper run into the lifted position. Mechanisms are provided for individually raising or lowering the magnet units. The cutter further has a second knife shaft pair situated downstream of the endless belt for severing the ferromagnetic sheet metal strips into length portions or blanks.

The feeding device according to the invention has an upwardly entirely open and thus well accessible depositing and transporting plane for the metal sheet strips. It is formed of simple parts whose motion involves no risks. To effect a format change for the sheet metal strips no mechanical parts need to be exchanged: mechanical parts (such as an abutment bar and a feed table) are merely reset. This, because of the good accessibility, causes no problems and only another energization of the magnet units underneath the upper run of the endless belt is needed for changing their height position. The feeding device according to the invention is adapted for a high output because no damage may occur due to the frictional engagement between the circulating endless belt and the sheet metal strips effected by the raised magnet units attracted to the metal strips.

In order to increase the magnetic effect of the magnet units, the latter may be formed as a plurality of individual magnets which are arranged in two rows (occasionally also in a superposed relationship) separated by a clearance extending parallel to the endless belt.

For ensuring an operationally safe run of the endless belt and for unequivocally predetermining a height position thereof, those edges of two adjoining plates that are oriented towards one another are downwardly angled and the respective edges of the upper run of the endless belt are positioned on the angled edges.

The height adjustment of the magnet units is preferably effected by pneumatic lifting cylinders.

DESCRIPTION OF THE PREFERRED EMBODIMENTS

Figure 1:
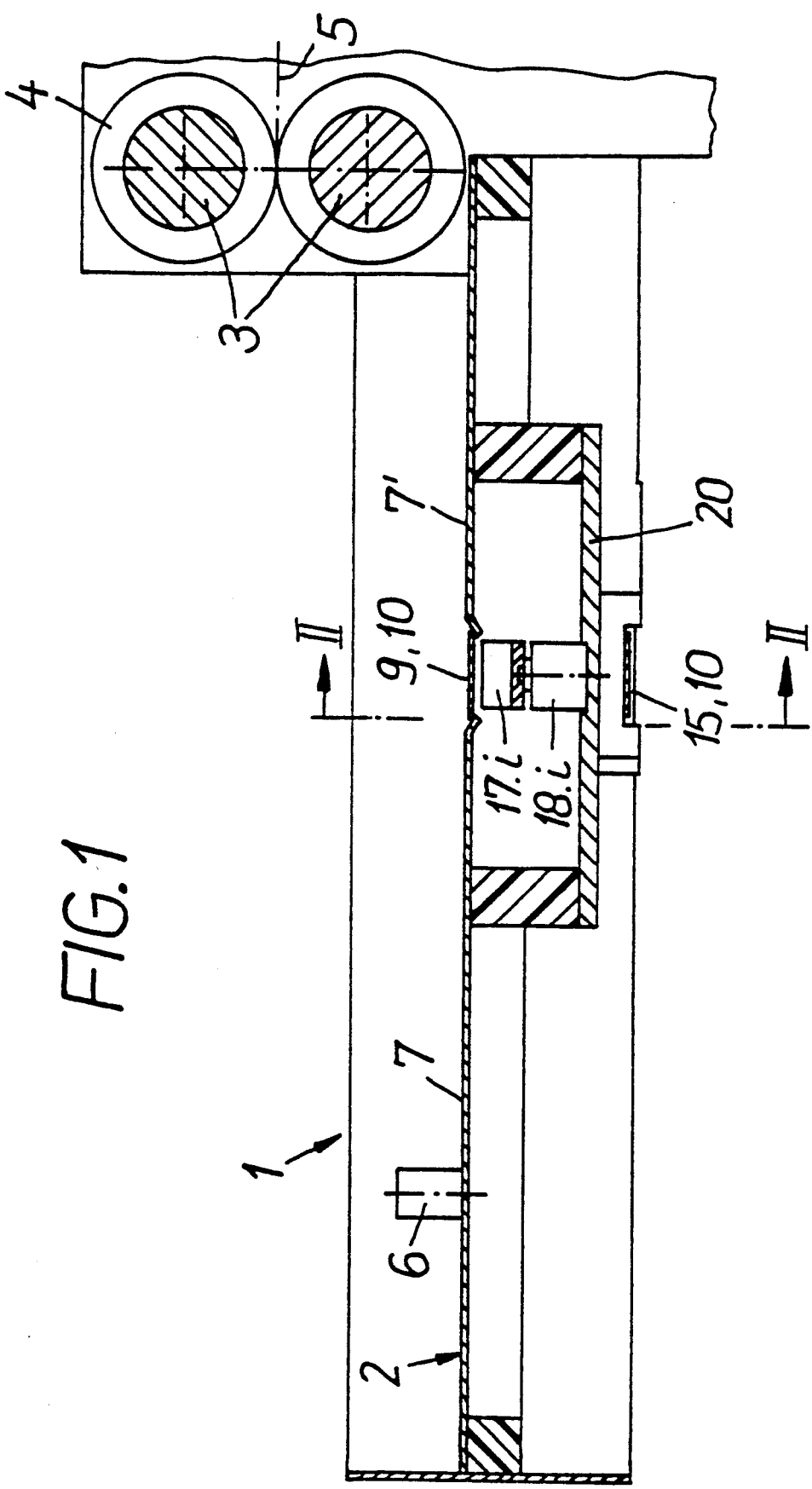
FIG. 1 is a sectional end elevational view of a preferred embodiment of the invention.

Turning to FIGS. 1-5, the feeding device shown therein includes a feed table 1 having a depositing and transporting plane 2 for ferromagnetic strips S.1, S.2 and S.3. The feed table 1 is situated underneath a first knife shaft pair 3 having roller knives 4. As viewed in FIG. 1, metal sheets are advanced from the right leftward at the height of a transporting plane 5 to the knife shaft pair 3 which cuts the sheets into strips. The strips leave the knife shaft pair 3 in the direction of the feed table 1 and are placed in their position of rest by means of an adjustable abutment bar 6 which extends parallel to the axes of the knife shaft pair 3.

Figure 4:
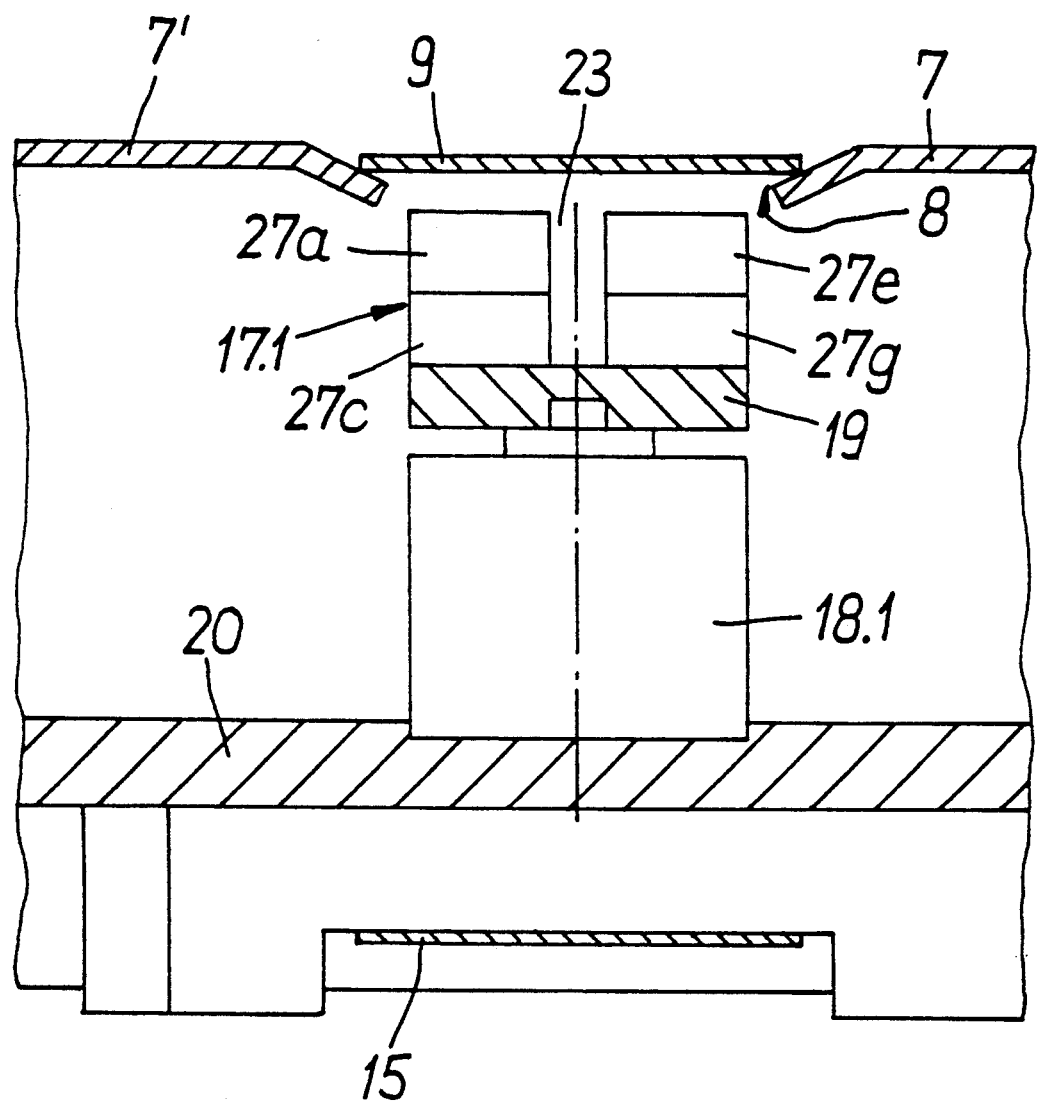
FIG. 4 is a sectional view taken along line IV—IV of FIG. 2.

The depositing and transporting plane 2 is defined by two parallel plates 7, 7' made of wear-resistant, anti-corrosive material with a smooth upper face and extending parallel to the axes of the knife shaft pair 3. Between the plates 7, 7' a clearance 8 is provided as shown in FIG. 4. The clearance 8 extends parallel to the axes of the knife shaft pair 3. The edge zones of the plates 7, 7' which form the clearance 8 are downwardly angled. The abutment bar 6 is adjustably mounted to the plate 7 which is remote from the knife shaft pair 3.

The upper run 9 of a flat endless belt 10 extends between the two plates 7 and 7' in the clearance 8. The upper run 9 lies with its lateral edges on the angled edge zones of the plates 7, 7' and its upper face is situated a few tenths of a millimeter underneath the transport plane 2 at a distance a, as shown in FIG. 5.

Figure 2:
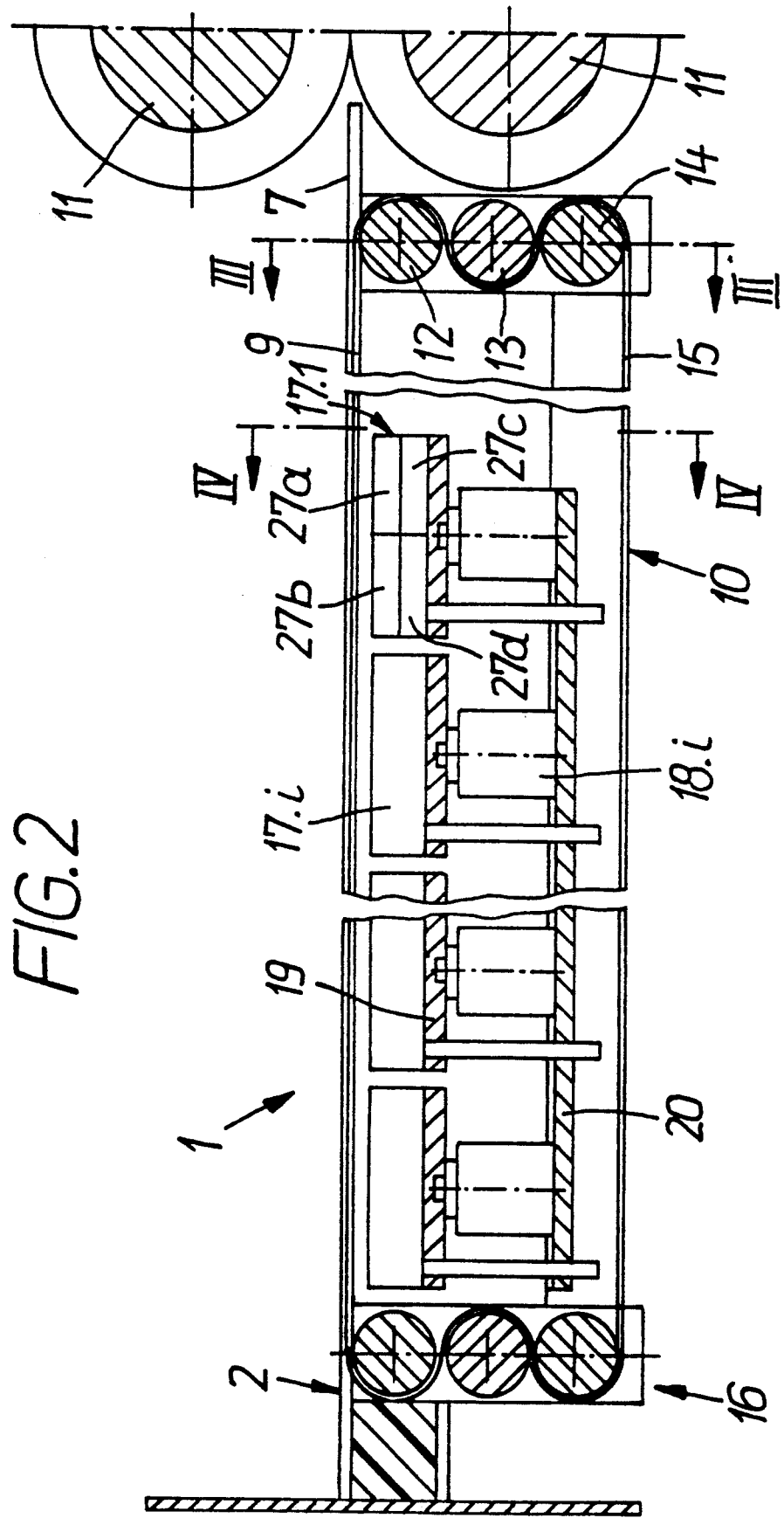
FIG. 2 is a sectional view taken along line II—II of FIG. 1.
Figure 3:
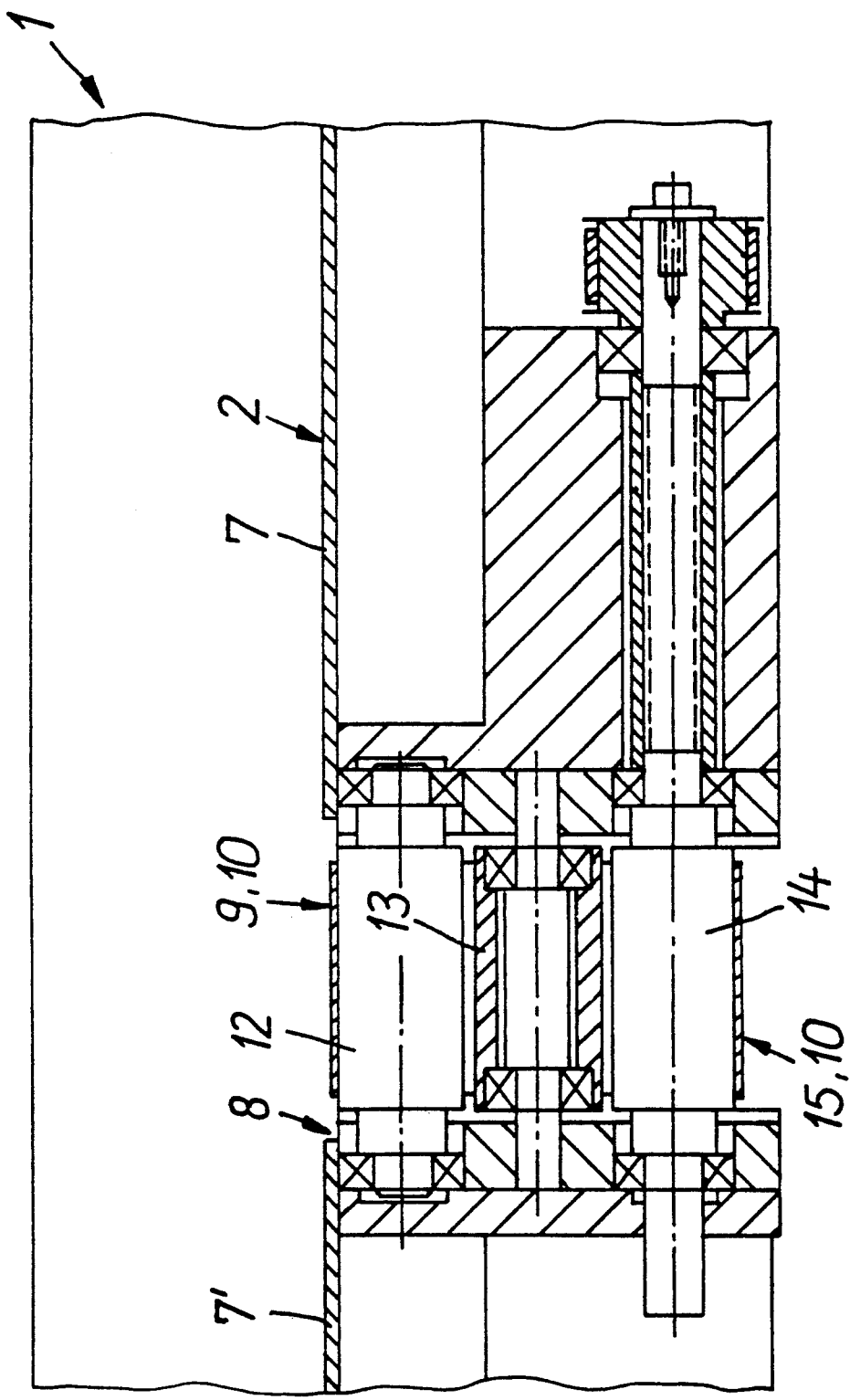
FIG. 3 is a sectional view taken along line III—III of FIG. 2.

Particularly referring to FIG. 2, the endless belt 10 is deflected directly in front of a second knife shaft pair 11 by a guide roller 12. Underneath the guide roller 12 there is centrally located a further guide roller 13 and underneath the guide roller 13 there is situated a drive roller 14 which supports the lower run 15 of the endless belt 10. The axes of the rollers 12-14 are situated vertically below one another so that the endless belt 10 has a significant loop angle of almost 180° about the drive roller 14.

The endless belt 10 is at that end of the feed table 1 which is situated remote from the knife shaft pair 11 deflected by a roller assembly 16, corresponding to the rollers 12-14, to effect a transition from the lower run 15 into the upper run 9. The roller assembly 16 may, as a whole, serve for tensioning the endless belt 10; it is feasible, however, to utilize only one roller, for example, the middle roller of the roller assembly 16 or another separate, non-illustrated roller for tensioning the endless belt 10.

Figure 5:
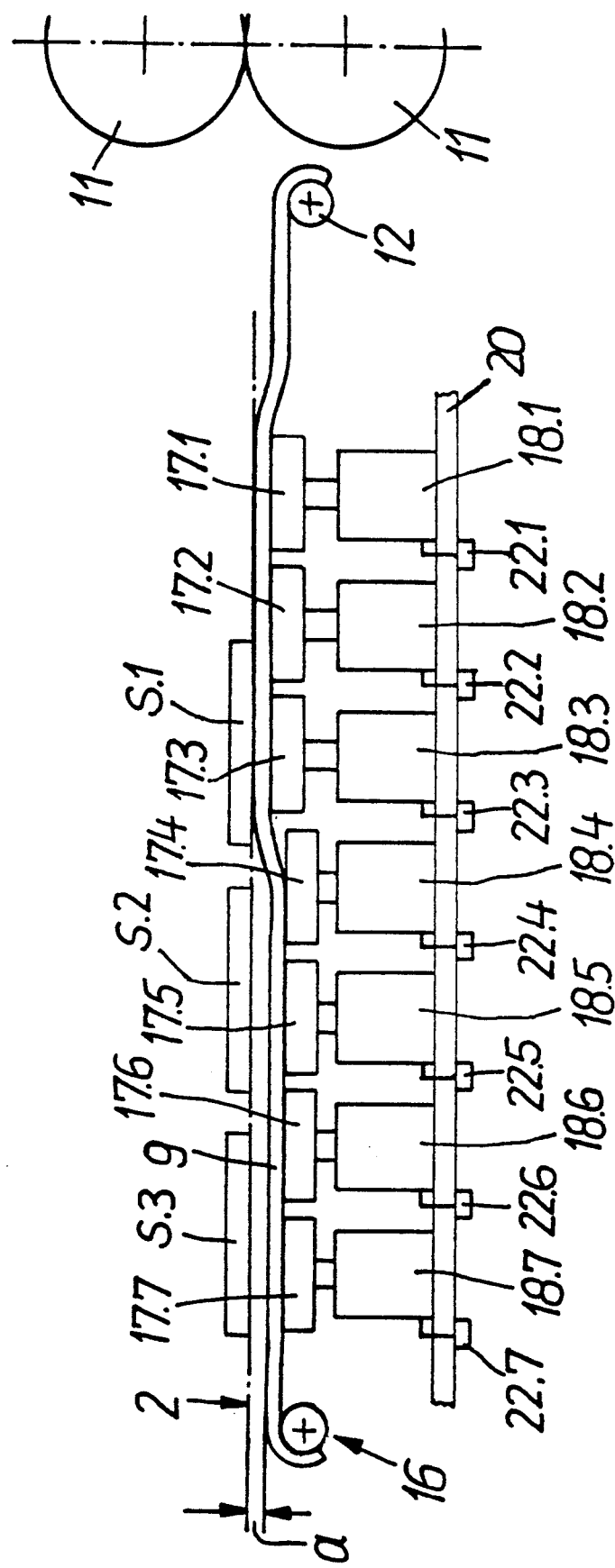
FIG. 5 is a schematic side elevational view of the preferred embodiment during the separation of the first sheet metal strip.

Particularly referring to FIG. 5, under the upper run 9 of the endless belt 10 there are situated magnet units 17.i (i=1...7, generally designated as i=1...n) which are mounted on a respective adjusting mechanism 18.i (i=1...7, generally designated as i=1...n). The magnet units 17.i may be one-piece structures (as shown in FIGS. 1 and 2 for 17.i) or may be formed of several magnet elements in equipolar orientation. In FIGS. 2 and 4 the magnet unit 17.1 is shown as being formed of eight individual magnets 27a-27h. The individual magnets 27a-27d lie—as viewed in FIG. 4—in a left-hand row, while the individual magnets 27e-27h lie in a right-hand row on a magnet holder 19 connected with the adjusting mechanism 18.1 (generally designated as 18.i) and are separated from the magnets 27a-27d by a clearance 23. It is noted that the individual magnets 27f and 27h are hidden in FIG. 2 by the individual magnets 27b and 27d and in FIG. 4 by the individual magnets 27e and 27g, respectively.

In the described embodiment the adjusting mechanisms 8.i are formed as individually controllable pneumatic lifting cylinders and are mounted on a common holder or carrier 20. The lifting cylinders 18.i are controlled by their own separate valves 22.i (i=1...7, generally designated as i=1...n).

To ensure that the strips discharged by the first knife shaft pair 3 arrive always centrally on the transporting plane 2 above the endless belt 10, the common feed table 1 is adjustable perpendicularly to the axes of the first knife shaft pair 3 in a horizontal direction.

As a departure from the described embodiment, the adjusting mechanisms 18.i may also be constituted by hydraulic cylinders or electric lifting magnets.

The separating process for the strips S.1-S.3 will be described with reference to FIG. 5. In this Figure the dimensions are, for the sake of clarity, significantly exaggerated. Particularly, the practically zero distance between the individual sheet metal strips is shown as extremely large in FIG. 5. The strips S.1 to S.3 are cut by the roller knives 4 of the knife shaft pair 3 from a metal sheet and lie side-by-side on the depositing and transporting plane 2. First, the valves 22.1 to 22.3 are switched so that the magnet units 17.1-17.3 are lifted. The upper run 9 of the endless belt 10 which before the actuation of the valves 22.1-22.3 is at a distance a of a few tenths of a millimeter underneath the transport plane 2 is, by means of the magnets 17.1-17.3 pushed upward in their zone to such an extent that the upper face of the upper run 9 is situated coplanar with the transport plane 2. By virtue of the pressure of the pneumatic cylinders 18.1-18.3 the upper run 9 is, in the lifted position, brought into close contact with the metal strip S.1. For this purpose the magnet units 17.1-17.3 exert an attracting force on the sheet metal strip S.1 so that between the upper run 9 and the strip S.1 there is obtained a frictional lock and the strip S.1 is carried by the endless belt 10 in the direction of the knife shaft pair 11. The roller knives of the knife shaft pair 11 transversely sever the sheet metal strip S.1.

As the sheet metal strip S.1 reaches an operationally predeterminable distance from the sheet metal strip S.2 or has been grasped by the roller knives of the knife shaft pair 11 for cutting the strip S.1 transversely into length portions, the valves 22.4 and 22.5 are activated and thus the magnet units 17.4 and 17.5 are lifted so that the sheet metal strip S.2 is entrained by the endless belt 10. As the sheet metal strip S.2 reaches an operationally predeterminable minimum distance from the sheet metal strip S.3 or the sheet metal strip S.2 is grasped by the knife shaft pair 11, the valves 22.6 and 22.7 are activated and the sheet metal strip S.3 is, by virtue of lifting the magnet units 17.6 and 17.7 entrained in the direction of the knife shaft pair 11. After the passage of the last sheet metal strip S.3 all valves 22.i are switched again so that all magnet units 17.i are lowered and the upper run 9 of the endless belt 10 is now again situated underneath the transport plane 2 and the feed table 1 is ready for depositing a successive set of sheet metal strips.

Figure 6:
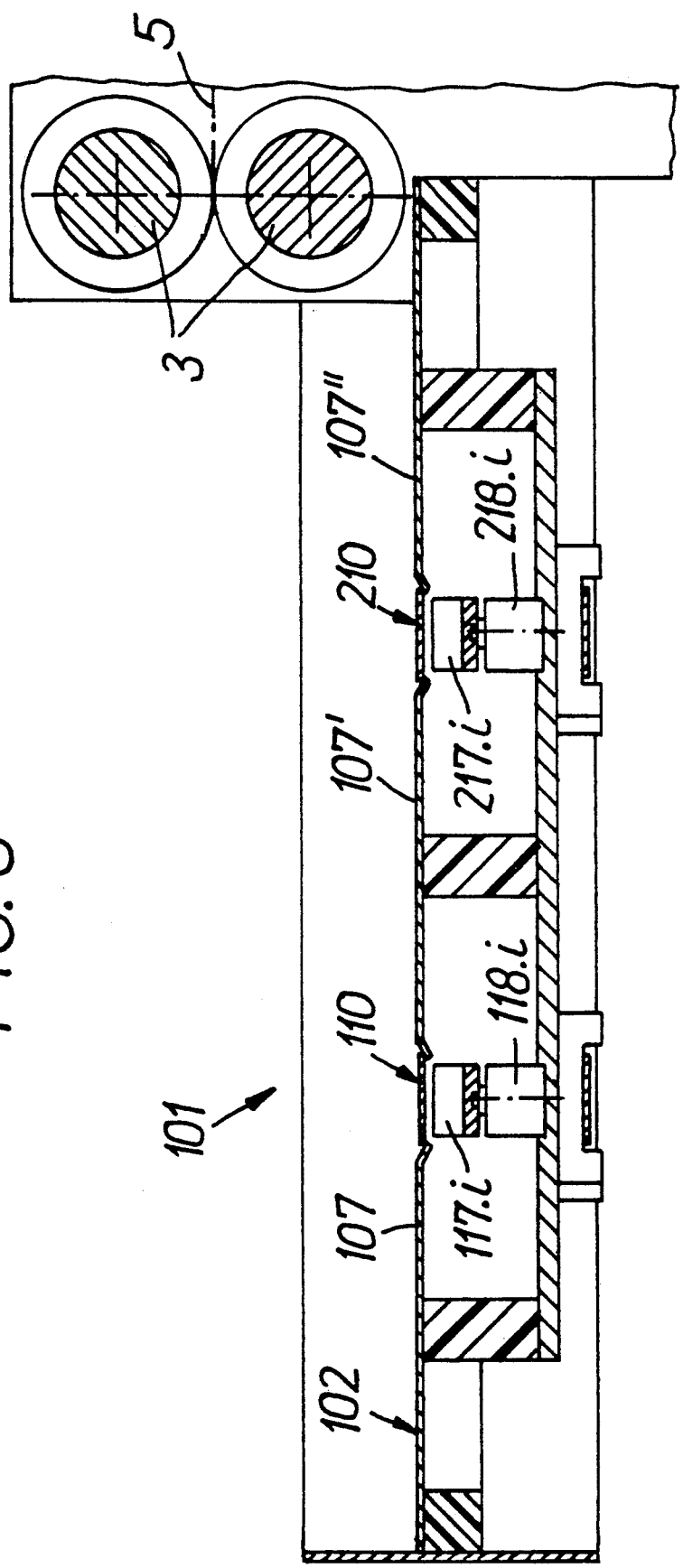
FIG. 6 is a sectional end elevational view of another preferred embodiment of the invention.

In another embodiment shown in FIG. 6 which is comparable to FIG. 1, the feed table 101 is provided with two endless belts 110 and 210 each situated between the plates 107, 107' and 107" defining the depositing and transporting plane 102. The structure of the endless belts 110 and 210 with the associated magnet arrangements 117.i and, respectively, 217.i and the associated setting mechanisms 118.i and 218.i corresponds to the structure of the endless belt 10. A longitudinal section through each of the endless belts 110 and 210 corresponds to the longitudinal section of the endless belt 10 shown in FIG. 2. During operation of the embodiment shown in FIG. 6, the magnet units 117.i and 217.i which in each instance have the same distance from the knife shaft pair 11, for example, the magnet units 117.1 and 217.1, are simultaneously lifted or lowered. Thus, in this manner, the metal strips are always simultaneously grasped at two points and securely transported without the risk of edgewise tilting.

It will be understood that the above description of the present invention is susceptible to various modifications, changes and adaptations, and the same are intended to be comprehended within the meaning and range of equivalents of the appended claims.

What is claimed is:

1. A roller knife cutter for longitudinally and transversely severing sheet metal, comprising
   (a) a first knife shaft pair having cooperating roller knives for severing a ferromagnetic metal sheet into sheet metal strips passing through said first knife shaft pair in a first direction of advance; the roller knives of said first knife shaft pair having axes oriented perpendicularly to said first direction of advance;
   (b) a plurality of substantially coplanar plates arranged downstream of said first knife shaft pair, as viewed in said first direction of advance, in a series in said first direction of advance; said plates being separated from one another by a clearance extending transversely to said first direction of advance; said plates having respective top surfaces receiving the sheet metal strips, severed by said first knife shaft pair, in a side-by-side orientation;
   (c) an endless belt having an upper run positioned in said clearance and extending parallel therewith; said upper run having a lowered position in which a top surface of said upper run is at a height level below the top surfaces of said plates; said upper run having a lifted position in which said top surface of said upper run is substantially coplanar with said top surfaces of said plates;
   (d) means for circulating said endless belt in a second direction of advance; said second direction of advance being oriented transversely to said first direction of advance;
   (e) a plurality of individually height-adjustable magnet units arranged in a series underneath said upper run parallel to said second direction of advance; each said magnet unit having a low position allowing said upper run of said endless belt to be situated in said lowered position in a zone above the magnet unit dwelling in said low position; each said magnet unit having a high position raising said upper run into said lifted position in a zone above the magnet unit dwelling in said high position;
   (f) power means for individually placing said magnet units into said low or high position; and
   (g) a second knife shaft pair situated downstream of said endless belt as viewed in said second direction of advance; said second knife shaft pair having cooperating roller knives for severing the ferromagnetic sheet metal strips into length portions as the sheet metal strips consecutively pass through said second knife shaft pair upon being advanced thereto by said endless belt in said second direction of advance.

2. The roller knife cutter as defined in claim 1, wherein said top surface of said endless belt is situated in said lowered position at a distance of 0.1 to 0.9 mm below the top surface of said plates.

3. The roller knife cutter as defined in claim 2, wherein said distance is 0.2 to 0.5 mm.

4. The roller knife cutter as defined in claim 1, wherein each said magnet unit is composed of a plurality of individual magnets.

5. The roller knife cutter as defined in claim 4, wherein in each said magnet unit the individual magnets are arranged in two rows separated by a clearance extending parallel to said second direction of advance.

6. The roller knife cutter as defined in claim 4, wherein the individual magnets are in a superpositioned relationship.

7. The roller knife cutter as defined in claim 1, wherein each said plate has downwardly angled opposite longitudinal edge zones; and further wherein said upper run of said endless belt has opposite longitudinal edges lying on said edge zones of adjoining said plates in said lowered position of said upper run.

8. The roller knife cutter as defined in claim 1, wherein said power means comprise pneumatic lifting cylinders.

* * * * *